April 10, 1945.   L. B. WALES   2,373,621
PRIME MOVER GOVERNING MECHANISM
Filed Dec. 13, 1943
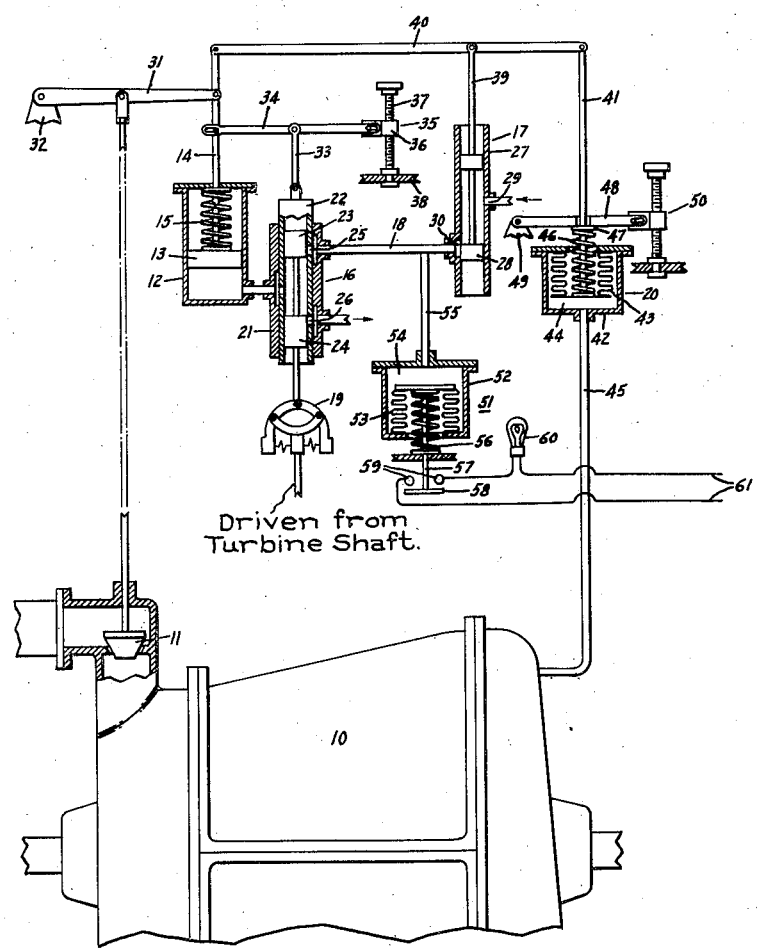
Inventor:
Lawrence B. Wales,
by Harry E. Dunham
His Attorney.

April 10, 1945.  L. B. WALES  2,373,621
PRIME MOVER GOVERNING MECHANISM
Filed Dec. 13, 1943
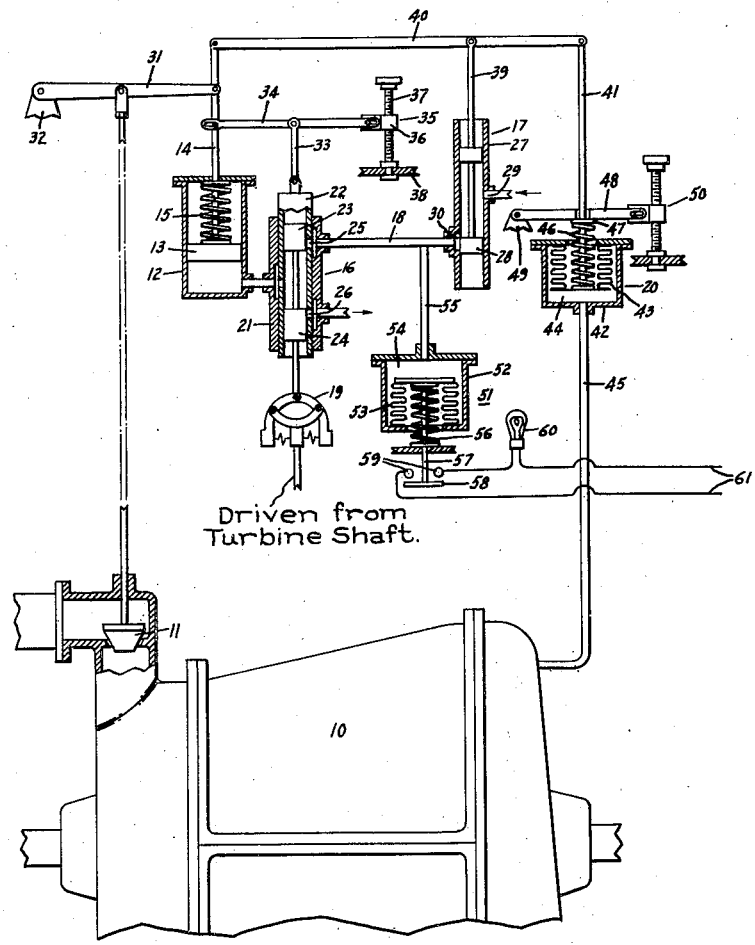
Inventor:
Lawrence B. Wales,
by Harry E. Dunham
His Attorney.

Patented Apr. 10, 1945

2,373,621

UNITED STATES PATENT OFFICE 2,373,621

PRIME MOVER GOVERNING MECHANISM

Lawrence B. Wales, Marblehead, Mass., assignor to General Electric Company, a corporation of New York Application December 13, 1943, Serial No. 514,011

7 Claims. (Cl. 121—42)

The present invention relates to prime mover governor mechanisms of the kind including two or more governors responsive to two or more variable operating conditions of a prime mover. More specifically, the invention relates to the type of mechanisms in which the several governors responsive to speed, inlet pressure, outlet pressure, load output and like conditions are arranged to operate one at a time through series-connected pilot valve means for controlling a servomotor. In arrangements of this kind it is desirable to know at any time which of the several governors is in active control, especially in case the mechanism includes separate means for controlling or adjusting the governors from some remote point. If at any time the operator knows which of the governors is in active control he can readily select the proper manual control means to take over or adjust the control of the prime mover. The object of my invention is to provide an improved construction and arrangement of prime mover control mechanisms of the type above specified which is simple in construction and effective in operation, permitting the operator at any time manually to adjust the proper control element to vary the operation of the mechanism. This is accomplished in accordance with my invention by the provision of an indicating or signaling device responsive to pressure changes between two series-connected pilot vales.

For a better understanding of what I believe to be novel and my invention, attention is directed to the following description and the claims appended thereto in connection with the accompanying drawing.

The single figure of the drawing illustrates a fluid actuated control mechanism embodying my invention applied to the control of an elastic fluid turbine.

The arrangement comprises an elastic fluid turbine 10 having an inlet valve 11 for controlling the flow of elastic fluid thereto. In the present example the prime mover or elastic fluid turbine is controlled by a mechanism for moving the inlet valve 11 in response to changes of either of two operating conditions, namely, the speed or the exhaust pressure of the turbine. To this end the mechanism includes a hydraulic motor 12 having a piston 13 with a stem 14 and biased downward by a spring 15. The hydraulic fluid conducted to the hydraulic motor 12 is controlled by means of two pilot valve assemblies 16 and 17 connected in series by a conduit 18. The first pilot valve 16 is controlled by a first governor, in the present instance, a speed governor 19, and the second pilot valve 17 is controlled by a second governor, in the present instance, a back pressure governor 20.

The first pilot valve 16 has a casing 21 with a bushing 22 slidably disposed therein and valve heads 23, 24 connected to the governor 19 for controlling an inlet port 25 and a drain port 26 respectively formed in the bushing 22. The motor 12 is connected to a supply or delivery port of the valve 16. The pilot valve 17 has a casing 27 with a valve head 28 for controlling the flow of fluid from an inlet port 29 which may be connected to any suitable source of fluid, such as oil under pressure, to an outlet or delivery port 30 connected to the aforementioned pipe 18. Valve head 28 also controls the discharge to atmosphere of the oil in conduit 18 through port 30.

The piston stem 14 of the hydraulic motor 12 is connected to the right-hand end of a lever 31 having a left-hand end held on a fulcrum 32 and an intermediate point pivotally connected to the valve 11. The bushing 22 of the pilot valve 16 is connected by a link 33 to an intermediate point of a lever 34 connected at its left-hand end to the stem 14 and at its right-hand end to an adjustable fulcrum 35. This adjustable fulcrum in the present example is in the form of a nut 36 connected to the lever 34 and adjustable vertically on a threaded rod 37 axially held on a support 38. The adjustable fulcrum with the threaded rod 37 broadly constitutes a means for manually adjusting the speed-governing mechanism. In actual practice it is customary to make such adjustment by remote control means, not shown, in the form of a remote control motor for rotating the rod 37.

The pilot valve 17 has a stem 39 connected pivotally to an intermediate point of a lever 40 which at its left-hand end is connected to the upper end of the servomotor stem 14 and at its right-hand end is connected to the upper end of a rod 41 of the pressure governor 20.

The governor 20 has a casing 42 with a bellows 43 disposed in the casing and forming therewith a pressure chamber 44 connected by a pipe 45 to the exhaust end of the turbine 10. The bellows 43 is biased downward against the pressure in the chamber 44 by means of a spring 46 bearing at its upper end against a spring plate 47 secured to a lever 48. The lever 48 is connected at its left-hand end to a fixed fulcrum 49 and at its right-hand end to an adjustable fulcrum 50. This adjustable fulcrum 50 broadly constitutes a means for manually adjusting the pressure governing mechanism. This adjustment may be made by remote control means, not shown.

The mechanism is adjusted so that at any time only one of the governors is in active control while the other is inactive. In order to indicate to the operator which of the governors is in active control, indicating or signaling means 51 are provided responsive to pressure changes in the conduit 18. The signaling means comprises a casing 52 with a bellows 53 therein forming a pressure chamber 54 connected by a pipe 55 to the conduit 18. The bellows 53 is biased upward by a spring 56 against the pressure in the conduit 54. The bellows is connected by a stem 57 to a contactor 58 cooperatively associated with contacts 59 forming part of an electric circuit including a signaling lamp 60 and wires 61 for connecting the lamp in series with the contacts 59 to an electric source.

In the position shown the speed governor is in active control, valve heads 23, 24 controlled by the speed governor 19 are in line-to-line position with and cover the ports 25, 26 respectively, the back pressure governor 20 is out of control, that is, made inactive by adjusting fulcrum 50 so that lever 48 compresses spring 46 and forces bellows 43 down against exhaust steam pressure carrying the pilot valve 28 downward so that port 30 is uncovered. In this position the fluid pressure in the conduit 18 is the same as in the inlet 29 of the pilot valve 17. In other words, full fluid pressure is supplied to the conduit 18 as if the second valve 17 were not present at all. The spring 56 of the signaling device 51 is adjusted so that with full fluid pressure in the conduit 18 the bellows 53 is forced downward into open position of the contacts 59, thereby giving indication by means of signalling lamp 60 that pilot 17 and pressure governor 20 are not in active control.

Upon increase in turbine speed due to decrease in load demand the weights of the speed governor 19 are forced outward, thus moving the valve heads 23, 24 downward and permitting discharge of fluid under pressure from the servomotor through the drain port 26 of the pilot valve 16. This causes downward movement of the piston 13 by action of the spring 15, resulting in closing movement of the turbine valve 11. Downward movement of the piston 13 with the stem 14 simultaneously causes follow-up movement of bushing 22 with regard to the pilot valve 16. The lever 34 is turned counterclockwise about the fulcrum 35 whereby the bushing 22 is moved downward into line-in-line position with the valve heads 23, 24, whereupon the discharge of liquid from cylinder 12 through port 26 ceases and the piston 13 comes to rest.

Upon downward movement of the stem 14 of the servomotor 12 the lever 40 is also turned counterclockwise about its right-hand end, thus causing downward movement of the valve head 28 of the pilot valve 17 and consequently further opening of the port 30 of the latter. This additional opening movement of the port 30, however, does not affect the operation of the mechanism. Upon decrease in speed the speed governor 19 moves the valve head 23 upward, permitting the flow of fluid under pressure from the inlet 29 through the pilot valve 17, the conduit 18, through the pilot valve 16, into the hydraulic motor 12, thus causing upward movement of the piston 13 and opening movement of the valve 11. Upward movement of the stem 14 causes follow-up movement of the lever 34, moving the bushing 22 upward into line-in-line position with the valve heads 23, 24. Simultaneously, the lever 40 is turned clockwise about its right-hand end, causing upward movement of the valve head 28 of the pilot valve 17, thus bringing the valve head 28 closer to its line-in-line position. Movement of the valve 28 again does not affect operation of the mechanism as long as the valve head 28 is out of line-in-line position and permits the supply of full fluid pressure from the inlet 29 to the conduit 18.

Upon further decrease in speed the operation just described will continue until the piston 13 reaches an upper end position in which the valve 11 is fully open. Should thereupon the speed further decrease, the valve head 23 is moved upward. Such movement, however, does not affect the servomotor which is already in fully open position. The pressure in the servomotor is then the full line pressure, that is, the same as the pressure in the inlet 29 of the pilot valve 17. The latter is adjusted so that with the piston 13 of the servomotor in its upper end position the pilot valve head 28 is about $\tfrac{1}{32}$ below its line-in-line position. In this instance, with both pilot valves 17 and 16 in out-of-line position, neither governor is in active control. Active control then may be assumed by the speed governor upon an increase in speed and by the pressure governor upon an increase in back or exhaust pressure. An increase in back pressure causes upward movement of the rod 41 by action of the device 20 and counterclockwise turning movement of the lever 40 about its left-hand end, thus bringing the valve head 28 into line-in-line position with the port 30. Once valve head 28 is in line-in-line position with its port, the back pressure may be said to be in active control and the speed governor is out of control. With full pressure from the line 29 cut off from the conduit 18 by the valve head 28, the pressure in the conduit 18 becomes the same as that in the servomotor 12.

Let us assume that at the moment the back pressure governor assumes control by closing port 30, the valve heads 23, 24 are in line-in-line position. In this position some of the fluid from the servomotor will slowly leak through the clearance between the valve head 24 and the bushing 22 of the pilot valve 16 and its drain port 26, thus causing slow downward movement of the piston 13, resulting in closing movement of the valve 11 and, what is more important, causing by the follow-up lever 34 downward movement of the bushing 22 of the valve 16 whereby the valve head 23 uncovers the port 25, permitting free flow of fluid between the conduit 18 and the servomotor 12 so that the pressure in conduit 18 (and pressure switch 51) falls to the lower value prevailing in pilot valve 16 and servomotor 12.

As pointed out above, with the pilot valve 16 in out-of-line position and the pilot valve 17 in line-in-line position closing port 30, the latter, more particularly the back pressure governor connected to it, is in active control of the turbine. Under such condition an increase in back pressure causes upward movement of the valve head 28, thus uncovering the lower end of the port 30 and permitting fluid to be drained from the servomotor 12 through the pilot valve 16, the port 30, to the lower end of the casing of the pilot valve 17. This causes downward movement of the piston 13 and closing movement of the valve 11. Simultaneously, downward movement of the piston 13 through the follow-up lever 40 causes downward movement of the valve head 23, returning the latter into its line-in-line position. At the same time downward movement of the stem 14 causes counterclockwise downward movement of the lever 34, resulting in downward movement of the bushing 22 and further opening of the port 25. This, however, has no effect upon the remainder of the mechanism once the port 25 is already in partial opening position permitting substantially unrestricted flow of fluid between the conduit 18 and the servomotor 12.

Decrease in back pressure causes downward movement of the pilot valve head 28 and the flow of fluid under pressure from the inlet 29 through the pilot valve 17, the conduit 18, the pilot valve 16, into the servomotor 12, resulting in upward movement of the piston 13 and opening movement of the valve 11.

During active control by the back pressure governor the pilot valve head 28 is normally in line-in-line position closing port 30 and, as pointed out above, the pressure in the conduit 18 is the same as in the servomotor 12 and of a value such that the spring 56 of the indicating device expands the bellows, forcing it upward to close the contacts 59 by the contactor 58. This results in closing of the circuit for the lamp 60 causing operation of the lamp. Thus, during back pressure control the lamp 60 is lighted whereas during speed governor control the lamp 60 is extinguished.

The adjustable fulcrums 35 and 50 permit at any time adjustment of the speed governor and back pressure governor respectively to vary the operation of the particular governor and also whenever desired to transfer operation from one governor to the other.

Having described the method of operation of my invention, together with the apparatus which I now believe to represent the best embodiment thereof, I desire to have it understood that the apparatus shown is only illustrative and that the invention may be carried out by other means.

What I claim as new and desire to secure by Letters Patent of the United States is:

1. Governing mechanism comprising a servomotor, a plurality of pilot valves for controlling the flow of operating fluid to the motor, separate governors responsive to changes of different operating conditions under the control of the mechanism, each governor controlling one of the pilot valves, and means including a pressure responsive device connected to the pilot valve for indicating which of the several governors is in active control.

2. Prime mover governing mechanism comprising a servomotor, a plurality of pilot valves for controlling the flow of operating fluid to the motor, separate governors responsive to changes of different operating conditions of a prime mover, each governor being connected to control one of the pilot valves, and signaling means responsive to the fluid pressure between the pilot valves for indicating transfer of active control from one governor to another.

3. Prime mover governing mechanism comprising a servomotor, a plurality of series connected pilot valves for controlling the flow of operating fluid to the motor, separate governors responsive to changes of different operating conditions of a prime mover, each governor controlling one of the pilot valves, and means responsive to pressure changes and connected between two pilot valves for indicating transfer of active control between the governors connected to such pilot valves.

4. Prime mover governing mechanism comprising a servomotor, a first pilot valve having an inlet port for receiving fluid under pressure and a supply port connected to the servomotor, a first governor for actuating the first pilot valve in response to changes of an operating condition of a prime mover, a second pilot valve having an inlet port for receiving fluid under pressure and a supply port, a conduit between the supply port of the second pilot valve and the inlet port of the first pilot valve, a second governor for actuating the second pilot valve in response to changes of another operating condition of such prime mover, and means connected to said conduit for indicating at any time which of the two governors is in active control.

5. Prime mover governing mechanism comprising a servomotor, a first pilot valve having an inlet port for receiving fluid under pressure and a supply port connected to the servomotor, a first governor for actuating the first pilot valve, a second pilot valve having an inlet port for receiving fluid under pressure and a supply port, a conduit between the supply port of the second pilot valve and the inlet port of the first pilot valve, a second governor for actuating the second pilot valve, and means including a pressure responsive device connected to said conduit and an electric signaling means cooperatively associated with the pressure responsive device for indicating which of the two governors is in active control.

6. Prime mover governing mechanism comprising a servomotor, a first and a second pilot valve, a conduit connecting the pilot valves in series to control the flow of fluid to the servomotor, a speed governor for actuating the first pilot valve, another governor for actuating the second pilot valve, lever means connecting the pilot valves to the servomotor, the other governor being normally inoperative while the speed governor is in active control and vice-versa, and means connected to said conduit and responsive to the fluid pressure therein for automatically indicating transfer of control between the governors.

7. Prime mover governing mechanism comprising a servomotor, a first and a second pilot valve connected in series to control the flow of fluid to the servomotor, a speed governor for actuating the first pilot valve, another governor for actuating the second pilot valve, lever means connecting the pilot valves to the hydraulic motor, the other governor being normally inoperative while the speed governor is in active control and vice-versa, and means for automatically indicating transfer of control between the governors, said means including a pressure responsive device connected between the pilot valves and signaling means cooperatively associated with the pressure responsive device.

LAWRENCE B. WALES.